Patented Aug. 26, 1952

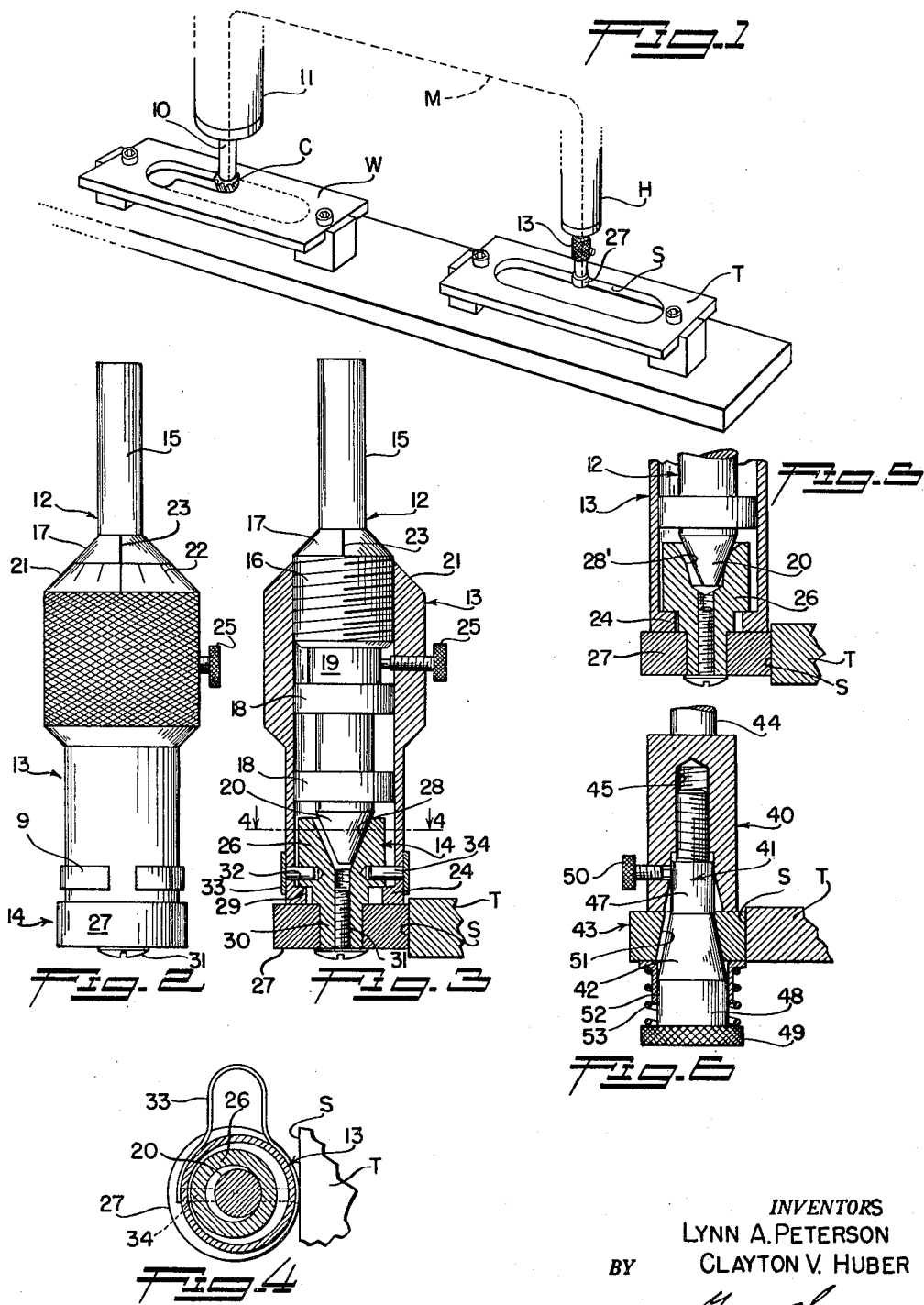

2,607,989

UNITED STATES PATENT OFFICE 2,607,989

ADJUSTABLE TRACER FINGER

Lynn A. Peterson, Burbank, and Clayton V. Huber, Los Angeles, Calif., assignors to Lockheed Aircraft Corporation, Burbank, Calif.

Application January 13, 1950, Serial No. 138,402

4 Claims. (Cl. 33—23)

This invention relates to machine tools and relates more particularly to tracer fingers for use in duplicating machines, pin routers, spar mills, lathes, and other machine tools where a tracer finger is moved along a template, or the like, to govern the motion of a cutting tool and thereby produce a cut corresponding with the contour of the template.

Many types of machine tools are controlled by mechanisms having a template and a finger or roller which moves along or upon the template to govern the motion of a cutter so that the course or path of the cutter is determined by the contour or configuration of the template. With such machines the size of the finished part or the nature of the cut to be made is determined not only by the size and shape of the template but also by the size of the cutter and the size of the finger which moves on the template, it being necessary that the tracer finger be of the same diameter as the cutter or of a given size with relation to the cutter. There are, of course, many sizes of cutters used on a given machine tool and cutters of only slightly different effective diameters are used for rough cuts and finish cuts in any given series of operations. Furthermore, reconditioning or sharpening of the cutters usually reduces their effective cutting diameters. Because of these factors it has, in the past, been necessary to stock and maintain a large number of tracer fingers graduated or varying only slightly in diameter and quite frequently a machine tool remains idle while a tracer finger of the required size is being obtained or made specially for a given job.

It is a general object of the present invention to provide a practical, effective adjustable or variable diameter tracer finger. The tracer finger of the invention may be set or operated to have effective or operating diameters within a considerable range thereby markedly reducing the number of tracer fingers required, assuring closer tolerances during the cutting or machining operations, and effecting economy in the operation of the machine.

It is another and important object of the invention to provide a variable diameter tracer finger incorporating a micro adjustment means whereby the effective diameter of the finger may be easily, quickly and accurately adjusted by simple turning or angular movement of a calibrated dial and then set or locked in the adjusted position.

Another object of the invention is to provide an adjustable or variable diameter tracer finger of the character mentioned that is small and compact and of such construction that it may be installed in the tracer head in the usual manner to cooperate with conventional templates. The device does not include bulky or projecting parts to interfere with its installation in the tracer head or with its proper cooperation with the template.

It is a further object of the invention to provide an adjustable tracer finger of this class that is simple and inexpensive to manufacture and that may be supplied with template engaging rolls of any required range of sizes.

Other objectives and features of the invention will become apparent from the following detailed description of typical preferred embodiments throughout which description reference will be made to the accompanying drawings in which:

Figure 1 is a perspective view illustrating a tracer finger of the invention operating in a template and controlling a cutting head, with parts of the machine tool being illustrated schematically;

Figure 2 is an enlarged side elevation of the tracer finger appearing in Figure 1;

Figure 3 is a vertical detailed sectional view of the tracer finger with the mandrel appearing in side elevation;

Figure 4 is a transverse detailed sectional view taken as indicated by line 4—4 on Figure 3;

Figure 5 is a fragmentary sectional view illustrating a modified form of construction; and Figure 6 is a view similar to Figure 3 illustrating another embodiment of the invention.

The devices of the invention may, of course, be designed and constructed for use with given or special machines and may be modified to adapt them for such applications. In the following description we will describe the typical embodiments of the device illustrated in the accompanying drawings, it being understood that the invention is not to be construed as limited or restricted to the particular details or application set forth.

In Figure 1 there is illustrated a workpiece W and a cutter C acting upon the workpiece. The cutter C is carried by a rotating shaft or spindle 10 which in turn forms a part of a movable cutting head 11. A template T is mounted for engagement by the tracer finger of the invention which is adapted to be removably secured in a tracer head H. The broken line M in Figure 1 represents the mechanism interconnecting the cutting head 11 and the tracer head H which mechanism forms a part of the machine tool and may be a mechanical, hydraulic or electrical instrumentality which causes the head 11 to follow a path identical with the path of movement of the tracer head H as determined by the movement of the tracer finger along the template T. As such mechanisms are well known to those skilled in the art the mechanism M has been indicated in the drawings in a schematic manner. The template T may either be of the internal type as illustrated or may be of the external type and, of course, its active surface S may be of any required configuration.

The tracer finger of our invention as illustrated in Figures 1 to 4 inclusive may be said to comprise generally a stem or mandrel 12, a shell 13 screw threaded on the mandrel for axial adjustment thereon, and a template engaging means 14 associated with the shell 13 and cooperating with the mandrel 12 to be shifted or adjusted radially upon relative axial movement between the mandrel and shell.

The mandrel 12 is an elongate part and forms the central or inner element of the finger assembly. In practice the mandrel 12 may be a one-piece member and is provided with an upper or outer end portion in the form of a shank 15 adapted to be removably secured in the tracer head H. The portion 16 of the mandrel 12 below the shank 15 is enlarged in diameter to carry the shell 13 as will be later described. A tapered or conical surface 17 is provided on the mandrel 12 between the shank 15 and the enlarged portion 16. The part of the mandrel 12 which continues downwardly or forwardly from the enlarged portion 16 is characterized by cylindrical lands 18 spaced apart by areas 19 of reduced diameter, the lands serving to support or stabilize the shell 13 as will later become apparent. The lower end of the mandrel 12 is provided with a tapered or conical surface 20 for cooperating with the template engaging means 14. The surface 20 is preferably of substantial length but may terminate at the flat small diametered end face of the mandrel. While the inclination of the surface 20 may be varied in different devices of the invention we have found it desirable to form the surface to have an included angle of approximately 43°. It is to be understood that the enlarged diametered portion 16, the lands 18, and the conical surface 20, are all concentric with the central longitudinal axis of the mandrel 12.

The shell 13 is preferably, though not necessarily, a one-piece member and is tubular to enclose or surround the major portion of the mandrel 12. The internal surface of the shell 13 rotatably bears on the cylindrical lands 18 of the mandrel and carries a thread for cooperating with a mating thread on the mandrel portion 16. The screw threads at the portion 16 may, in practice, be No. 40 threads. The upper part of the shell 13 may have increased wall thickness and is preferably externally knurled or roughened to facilitate manual turning or adjustment. The upper or outer end of the shell 13 presents an inclined or conical surface 21 which may have the same inclination as the adjacent mandrel surface 17. The surface 21 is provided with a number of equally spaced, axial calibrations 22 for cooperating with a single axial mark 23 on the mandrel surface 17 to constitute a micro indicating means for indicating the radial adjustment or position of the template engaging means 14. A set screw or lock screw 25 is threaded through a radial opening in the wall of the shell 13 and its inner end is adapted to cooperate with a surface 19 of the mandrel 12 to set or lock the shell 13 in any selected adjusted position. The shell 13 continues downwardly or forwardly beyond the conical mandrel surface 20 and is provided at its end with an internal annular flange 24 presenting a concentric internal surface and a flat normal upper or inner surface.

The template engaging means 14 serves to ride on the surface S of the template T to guide or direct the cutter C through the medium of the mechanism M and in accordance with the invention the active or effective radial position of the means 14 may be varied or adjusted by angular movement of the shell 13 to regulate the effective diameter of the tracer finger. The means 14 includes a socket member 26 for engaging the conical surface of the mandrel 12 and carrying a roller 27 for riding on the template surface S. The socket member 26 is contained within the shell 13 and has an opening or socket 28 in its inner end for receiving the conical end of the mandrel 12. In the structure illustrated in detail in Figure 3 the socket 28 is conical and its wall has substantially the same pitch or inclination as the surface 20. However, the mean diameter of the socket 28 is considerably larger than the mean diameter of the mandrel surface 20 so that the member 26 is free to shift radially relative to the mandrel and shell assembly. The socket member 26 is stepped or shouldered to have a radial annular shoulder 29 which rides on the upper surface of the above described flange 24 of the shell 13. Thus the socket member 26 is held against axial movement or displacement by the cooperation of its socket 28 with the conical mandrel surface 20 and by the cooperation of the shoulder 29 with the flange 24 but the socket member is free to be adjusted radially upon relative axial movement between the mandrel 12 and shell 13.

The forward or outer end of the socket member 26 has a trunnion or shaft 30 of reduced diameter carrying the roller 27. A screw 31 is threaded in a central opening in the shaft 30 and its head retains the roller 27 on the shaft 30. The roller 27 may be free to rotate on the shaft 30 as a result of its cooperation with the template surface S or the roller may be tightly clamped on the shaft 30 in which case the socket member 26 turns on the conical surface 20 of the mandrel 12. In order to facilitate removal and replacement of the roller 27 radial openings 32 are provided in the wall of the shell 13 and in the socket member 26 to receive a pin or wrench for holding the member 26 against rotation when the screw 31 is being installed and removed. In Figures 3 and 4 we have shown a wrench in the form of a spring 33 shaped to fit about the shell 13 and provided with diametrically aligned pins 34 for engaging in the openings 32 to hold the socket member 26 against turning. It is to be understood that when the tracer finger is to be used for engaging the template T the wrench 33 is removed from the finger. A slip ring or snap ring 9 is engaged on the shell 13 to close the openings 34 against the entrance of cuttings etc., when the device is in service.

Figure 5 illustrates a slightly modified form of construction wherein the wall of the socket 28' in the socket member 26 has a curvature or radius. While the socket 28' conforms generally with the conical surface 20 of the mandrel 12, the wall of the socket is convex to have only substantially point contact with the mandrel surface 20 with the member 26 in any adjusted position. The structure of Figure 5 is somewhat simpler to manufacture than the arrangement illustrated in Figure 3.

It is believed that the operation of the tracer finger illustrated in Figures 1 to 4 inclusive will be understood from the foregoing detailed description. Assuming that a roller 27 of selected diameter is secured on the member 26 and assuming that the set screw 25 has been loosened, the shell 13 may be rotated relative to the mandrel 12 to adjust the effective diameter of the finger as required. It will be seen that upon angular movement of the shell 13 in one direction the socket member 26 is moved upwardly on the conical surface 20 so that the member and its template engaging roller 27 are moved or adjusted radially outward to increase the effective diameter of the finger. On the other hand, when the shell 13 is turned in the other direction the socket member 26 is moved downwardly on the conical surface 20 to adjust the roller 27 radially inward to decrease the effective diameter of the finger. Following such an adjustment the screw 25 is tightened to lock or set the parts in the adjusted positions. When the tracer finger is in operation the engagement of the roller 27 with the surface S of the template T holds the wall of the socket 28 against one side of the conical mandrel surface 20, the wall of the socket being spaced from other parts of the conical surface. This relationship is clearly illustrated in Figure 3. As the roller 27 is at all times urged against the template surface S the engagement of the socket 28 with the surface 20 is uninterrupted. It will be apparent that by properly relating the threads on the mandrel part 16 and shell 13, the inclination of the surface 20 and the spacing of the calibrations 22, simple adjustment of the calibrations 22 relative to the mark 23 will effect a given radial adjustment of the roller 27. Furthermore, the parts may be related and proportioned so that the finger has a substantial range of adjustment reducing the number of fingers that are required for a full range of cutter sizes etc. The screw 25 at the reduced area 19 serves to limit relative threading of the mandrel 20 and shell 13 to prevent unintentional disassembly of the device.

Figure 6 illustrates another and simplified form of the invention. This adjustable tracer finger includes a mandrel 40, a stem 41 adjustably screw threaded with the mandrel 40 and presenting a conical surface 42 and template engaging means in the form of a roller 43 cooperating with said surface 42 and held in cooperation with the mandrel 40 to be adjusted radially upon relative axial movement between the mandrel and stem.

The mandrel 40 has a shank 44 of reduced diameter adapted to be secured in the tracer head H. The forward or lower end of the mandrel 40 has a central longitudinal opening 45 and the entrance to this opening may be in the form of an enlarged socket.

The above mentioned stem 41 has its inner portion adjustably screw threaded in the opening 45 of the mandrel and has an unthreaded intermediate portion 47 of somewhat enlarged diameter received in the above mentioned socket part of the opening 45. The conical surface 42 of the stem 41 continues downwardly or outwardly from the portion 47 and the outer part 48 of the stem terminates in a knurled head or knob 49 for facilitating manual adjustment of the stem. A set screw or lock screw 50 is threaded in a radial opening in the wall of the mandrel 40 and is engageable with the intermediate portion 47 of the stem 42 to set or lock the stem in its adjusted position.

The template engaging roller 43 is arranged at the lower or forward end of the mandrel 40 to surround the conical surface 42. The external surface of the roller 43 is cylindrical to conform with the surface S of the template T. The opening 51 in the roller 43 is preferably conical to conform with the stem surface 42 although the mean diameter of the opening 51 in the roller is considerably larger than the mean diameter of the conical surface 42. A flanged sleeve 52 is arranged on the stem portion 48 and a coiled spring 53 is engaged under compression between the knurled head 49 and the sleeve to urge the sleeve and the roller 43 upwardly so that the roller is at all times held against the end of the mandrel 40. This maintains the roller 43 in its active position. The spring 53 maintains the sleeve 52 against the lower or outer side of the roller 43 where it prevents cuttings from entering the roller and the mandrel 40.

It will be seen that upon loosening the screw 50 the stem 41 may be threaded or adjusted axially relative to the mandrel 40 and roller 43. Such axial adjustment of the stem 41 moves the conical stem surface 42 either inwardly or outwardly with respect to the roller 43 to change the effective diameter of the tracer finger by shifting the roller 43 radially inward or outward as the case may be. Following such adjustment the screw 50 is tightened to lock or set the parts in the adjusted position. In the operation of the tracer finger the roller 43 is at all times urged against the surface S of the template T so that the wall of the tapered opening 51 in the roller presses against or rides on one side of the conical stem surface 42, as clearly illustrated in Figure 6, but the roller 43 is free to rotate on the surface 42 so that any minor wear that may accompany the operation of the tracer finger is well distributed.

Having described only typical forms of the invention we do not wish to be limited to the specific details hereinset forth, but wish to reserve to ourselves any variations or modifications that may appear to those skilled in the art and fall within the scope of the following claims.

We claim:

1. A tracer finger comprising a mandrel having a substantially conical surface, a member having an opening surrounding at least a portion of the mandrel to receive said surface, the opening having an average diameter greater than the average diameter of said surface so that the wall of the opening is engageable with a side region of the surface to support the member against lateral pressure, the wall of the opening being convexly curved to have substantially point contact with said surface, a part on the member adapted to press laterally against a face to be traced, the part and said member constituting an assembly that is axially movable relative to the mandrel, a shell movable on the mandrel and connected with said assembly to move the same axially therewith in both axial directions relative to said surface to adjust the member laterally, and means for moving the shell axially of the mandrel.

2. A tracer finger comprising a mandrel having a substantially conical surface, means for engaging a face to be traced and having an opening surrounding at least a portion of the mandrel to receive said surface, the opening having an average diameter greater than the average diameter of said surface so that the wall of the opening is engageable with a side region of the surface to support the means against lateral pressure, a surface on said means adapted to press laterally against the face to be traced, a shell on the mandrel associated therewith for axial movement thereon, cooperating surfaces on said means and shell connecting said means with the shell for positive axial movement therewith in both directions and relative to said surface so that said surface adjusts said means laterally of the mandrel, and mating screw threads on the mandrel and shell operable to move the shell axially upon rotation of the shell.

3. A tracer finger for following a surface including a mandrel having a conical part, a member having a generally conical opening for receiving said part, the average diameter of the opening being larger than the average diameter of said part so that the wall of said opening is adapted to engage a side portion of said part, a shell movable on the mandrel and cooperating with said member to move the same axially therewith in one direction, a roller rotatable on said member for engaging said surface, means restraining the roller against axial movement on the member, cooperating surfaces on the shell and roller whereby the shell is operable to move the roller and member axially in the other direction, mating screw threads on the mandrel and shell operable upon angular movement of the shell to move the shell and member axially of the mandrel and thus move the member axially on said conical part to adjust the member laterally, and means for securing the shell against angular movement with the member in selected adjusted positions.

4. A tracer finger for following a surface including a mandrel having a conical part, a member having a generally conical opening for receiving said part, the average diameter of the opening being larger than the average diameter of said part so that the wall of said opening is adapted to engage a side portion of said part, the wall of the opening being convexly curved to have substantially point contact with said part, a shell movable on the mandrel and cooperating with said member to move the same axially therewith, a roller on said member for engaging said surface, mating screw threads on the mandrel and shell operable upon angular movement of the shell to move the shell and member axially of the mandrel and thus move the member axially on said conical part to adjust the member laterally, and means for securing the shell against angular movement with the member in selected adjusted positions.

LYNN A. PETERSON.
CLAYTON V. HUBER.

REFERENCES CITED

The following references are of record in the file of this patent:

UNITED STATES PATENTS

| Number | Name | Date |
| --- | --- | --- |
| 1,840,853 | Shaw et al. | Jan. 12, 1932 |
| 2,225,717 | Shaw | Dec. 24, 1940 |
| 2,397,108 | Hanna et al. | Mar. 26, 1946 |
| 2,557,876 | Klema | June 19, 1951 |